June 17, 1930. A. P. KEARNS 1,764,208
DUSTCAP DEVICE
Filed Jan. 26, 1928
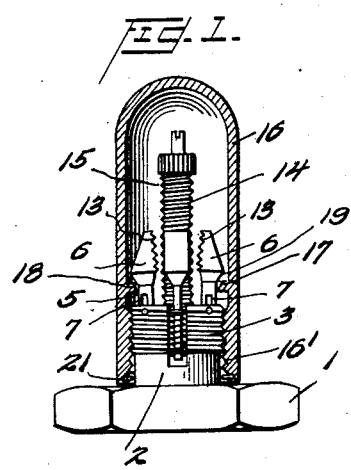
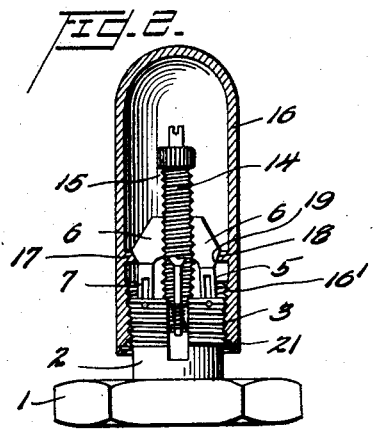
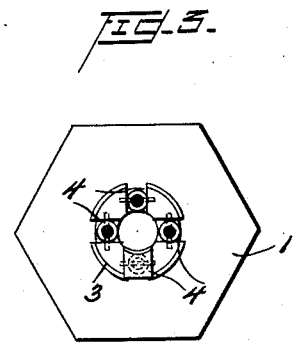
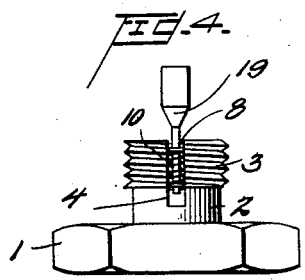
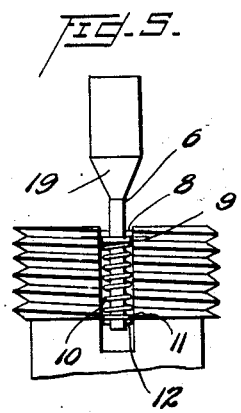
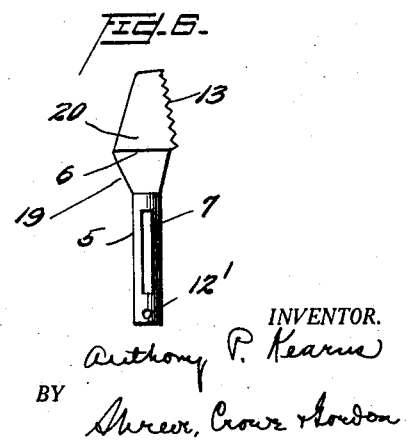
INVENTOR.
Anthony P. Kearns
BY
ATTORNEYS Patented June 17, 1930

1,764,208

UNITED STATES PATENT OFFICE

ANTHONY P. KEARNS, OF NEWARK, NEW JERSEY

DUSTCAP DEVICE

Application filed January 26, 1928. Serial No. 249,604.

Generically this invention relates to closures or dust caps for valve stems, but it is more especially directed to the automobile type of valve stem, and is not only adapted to protect the valve stem from dirt or the like and to lock the stem to the wheel felly, but to effect the entire elimination of the conventional rim lock nut.

The principal object of the invention is the provision of a valve cap of this character including a base member or lock nut cooperatively associated therewith so as to be removed from the valve stem as a unit and adapted in operative position to lock the valve stem to the wheel felly.

An important object of the invention is the provision of a device of this character comprising coacting means adapted to engage the wheel felly and the valve stem to normally lock the latter in place, said means adapted to be removed as a unit when desired.

Another object of this invention is the provision of a device of this character comprising a lock nut adapted to engage the wheel felly, a dust cap threadedly connected thereto, and releasable means carried by the lock nut adapted to effect engagement of the lock nut with the felly and the releasable means with the valve stem to lock the valve stem in position by actuation of the cap in one direction, and to effect disengagement of the releasable means by anticlockwise movement in the opposite direction to effect removal of the device as a unit from the valve stem.

A still further object of this invention is the provision of a device of this character, including a lock nut formed with a vertical tubular portion threaded to engage the complemental threads of a dust cap and having mounted in the upper end of the tubular portion a plurality of normally spring controlled lock arms adapted to threadedly engage the valve stem, actuation of the cap in one direction simultaneously effecting contact of the lock arms with the valve stem and lock nut with the wheel felly to operatively position the device and effect locking of the valve stem with respect to the wheel felly.

With these and other objects in view, which will become apparent as the description proceeds, the invention resides in the construction, combination and arrangement of parts, hereinafter more fully described and claimed, and illustrated in the accompanying drawings, in which like characters of reference indicate like parts throughout the several figures, of which:

Fig. 1 is a cross sectional view of my improved dust cap in position to be removed from the valve stem;

Fig. 2 is a similar view showing the device operatively positioned with lock arms engaging the valve stem;

Fig. 3 is a top plan view of the base member or lock nut with the lock arms and cap removed;

Fig. 4 is a side elevation of the lock nut with the dust cap removed and showing one of the lock arms in position.

Fig. 5 is a fragmentary enlarged detail view of a portion of the lock nut showing one of the lock arms operatively mounted therein; and Fig. 6 is a detailed view of one of the lock arms removed from the device.

The devices of this character with which I am familiar have proven deficient by reason of their intricate construction, difficult manner of attachment and detachment, liklihood of loss during vehicular travel over rough roadways, and for other reasons unsatisfactory, and it was to produce a device susceptible of being easily positioned, removable as a unit, adapted to simultaneously effect operative engagement with the wheel felly and the valve stem to lock the device in position and simultaneously effect locking of the valve stem to the felly, and likewise eliminating the separate removal of the lock nut where it is necessary to remove the tire from the wheel, that I designed the device forming the subject matter of this invention.

In the illustrated embodiment characterizing this invention there is shown a base or lock nut member 1, formed with an upstanding tubular portion 2, preferably formed with left hand male threads 3 for a purpose hereinafter more fully appearing. The upper end of the tubular portion 2 is castled, that is formed, in the present instance, with slots 4, each slot adapted to receive the lower portion 5 of a lock arm 6, said lower portion 5 is provided with a slot 7 through which is adapted to extend pin 8, suitably mounted in the upper end of portion 2 and extending across slot 4, as clearly shown in Fig. 5 of the drawing. Washer 9, coil spring 10 and washer 11, respectively, is adapted to be mounted on the portion 5 which is preferably cylindrical to correspond to the conformation of the spring, said washers and spring being secured thereon by pin 12, extending through opening 12′ formed in the arm 6, so that washer 9 will seat against pin 8 and the arm will normally be maintained in retracted position by the force of spring 10, as will be clear without further description. Each of the arms have a concave surface formed with right hand female threads 13, adapted to detachably engage the threads 14 of valve stem 15, which will be hereinafter more fully explained. A cylindrical dust cap 16 open at one end and formed intermediate its length with an internal integral cam ring 17 having an inclined face 18 adapted to frictionally engage the complemental inclined or cam surface 19, formed on the enlarged jaw 20 of the arm 6, for a purpose to be hereinafter explained. The open end of cap 16 is formed with internal left hand female threads 16′ adapted to engage the complemental threads 3 of tubular portion 2 of the nut 1 when the parts are operatively associated, so that actuation of the cap to the right will tend to separate the lock nut and cap, and in order to prevent complete separation, one or more screw pins 21 are suitably mounted in the lower end of cap 16 extending beyond the inner wall thereof.

Although the operation of the device would seem to be clear from the above description, it might be well to further state, that when the device is positioned over the valve stem with the nut frictionally contacting the wheel felly, the dust cap is turned to the right, which causes the cap to move away from the lock nut by virtue of the left hand threads, causing the lock ring to exert force against the lock arms, causing them to grippingly contact the valve stem, at the same time forcing the lock nut against the felly, thereby not only effectively securing the device in position, but likewise locking the valve stem against movement with respect to the felly.

It will be observed that the coil springs tend to exert a downward force on the lock arms, preventing them from being carried up by the lock ring and so the force exerted on the lock arms by the lock ring causes the teeth to grip the valve stem. The lock nut cannot turn once the lock arms grip the valve stem, since they fit into the grooves of the lock nut tubular portion. The dust cap cannot then move upward away from the lock nut, since the lock ring contacting the lock arms secures them on the valve stem, the teeth on the locks arms are right hand female threads and therefore if the lock arms should turn on the valve stem it would tend to move the whole device toward the wheel felly, aiding the tightening effect. To remove the device it is but necessary to effect a few turns of the dust cap to the left, effecting release of the lock arms and rendering the device removable from the valve stem as a unit.

From the above, it will be apparent that I have designed a device of the character described, entirely eliminating the conventional lock nut for securing the valve stem to the felly, susceptible of being easily positioned and simultaneously effecting fastening of the device in position and locking the valve stem to the felly, and removable as a unit, thereby eliminating the additional operation of removing the lock nut as is now prevalent when it is desired to change the automobile tire, yet simple in construction, manufacturable at a negligible cost, and efficient for the purposes intended.

Although in practice I have found that the form of my invention illustrated in the accompanying drawings and referred to in the above description as the preferred embodiment, is the most efficient and practical; yet realizing the conditions concurrent with the adoption of my invention will necessarily vary, I desire to emphasize that various minor changes in details of construction, proportion and arrangement of parts, may be resorted to within the scope of the appended claims without departing from or sacrificing any of the principles of this invention.

Having thus described my invention, what I desire protected by Letters Patent is as set forth in the following claims:

1. A dust cap device comprising a lock nut member adapted to slip over the valve stem of an automobile tire, a plurality of lock arms formed with cam surfaces loosely mounted in said member, a spring means coacting with each of the arms to normally maintain the same in retracted position and out of engagement with said valve stem, a cap member formed interior thereof with an annular member having a cam face for engagement with the cam surfaces of said arms to force the latter inwardly against the action of the springs and simultaneously effect interlocking engagement between the locking arms and valve stem and lock nut and felly concomitant with the rotation of the cap in a predetermined direction with respect to the lock nut member to secure said device to the felly and prevent movement of said valve stem with respect thereto.

2. A dust cap device comprising a lock nut member having a tubular portion adapted to slip over the valve stem of an automobile tire, a plurality of lock arms loosely mounted in said tubular portion, spring actuated means in connection with the locking arms to normally maintain same out of engagement with the valve stem, a cap member adapted to threadedly engage said tubular portion, cam means carried by a cap adapted to engage the cam surfaces of said lock arms to force the same against the tension of said springs to effect their gripping engagement with the valve stem when the cap is rotated in a predetermined direction and simultaneously effect frictional engagement of the lock nut with the felly to rigidly secure said device thereto and prevent movement of the valve with respect to said felly.

3. A dust cap device comprising a lock nut adapted to slip over the valve stem of an automobile tire, having a threaded tubular portion formed with a plurality of slots, a lock arm having a cam surface retractibly mounted in each of said slots, a dust cap adapted to embrace said arms and the valve-stem of an automobile wheel and threadedly engage said tubular portion, said cap being formed with cam means adapted to engage the cam surfaces of said arms to force the same inwardly against the tension of their springs and effect gripping engagement thereof with said valve stem and simultaneously effect frictional engagement of the said lock nut with the wheel felly when said cap is actuated in tightening direction to secure said device on said valve stem and prevent movement of said stem with respect to the felly.

4. A dust cap comprising a lock nut member including a tubular portion adapted to encircle the valve stem of an automobile tire, a plurality of locking members having cam surfaces associated with said portion and relatively movable with respect thereto, means in connection with the locking members to normally maintain same out of engagement with said tubular portion, a cap member formed interiorly with a projection having a cam face, said cam face adapted to engage the cam surfaces of the locking members to force the latter inwardly and into gripping engagement with the valve stem when the cap is rotated in a predetermined direction the interaction of the locking members with the valve stem in conjunction with the rotation of the cap functioning to force the locking nut into rigid engagement with the felly of the wheel.

5. A dust cap comprising a lock nut member including an externally threaded collar adapted to encircle the valve stem, a plurality of locking members having cam surfaces associated with the collar and relatively movable with respect thereto, spring actuated means in connection with the locking members to normally maintain same out of engagement with the valve stem, a cap member formed with an interior projection having a cam surface, said cap member being internally threaded for engagement with the threaded portion of the collar, said cam surface adapted to engage the cam surfaces of the locking members to force the latter inwardly against the tension of their springs and at the same time force them into gripping engagement with the valve stem when the cap is rotated in a predetermined direction, the interaction of the locking members with the valve stem and in conjunction with the rotation of the cap being adapted to force the locking nut into rigid engagement with the felly of the wheel.

ANTHONY P. KEARNS.